(12) United States Patent
Murano et al.

(10) Patent No.: US 6,725,991 B2
(45) Date of Patent: Apr. 27, 2004

(54) DRIVING DEVICE AND FIXING DEVICE

(75) Inventors: Junichi Murano, Saitama-Ken (JP);
Kazuyoshi Matsumoto, Tokyo (JP);
Katsunori Shoji, Kanagawa-Ken (JP);
Osamu Takashima, Tokyo (JP);
Toshiyuki Uchida, Kanagawa-Ken (JP);
Kiyoshi Tsukamura, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/231,272

(22) Filed: Aug. 30, 2002

(65) Prior Publication Data

US 2003/0047407 A1 Mar. 13, 2003

(30) Foreign Application Priority Data

Aug. 31, 2001 (JP) ........................... 2001-263636
Jul. 30, 2002 (JP) ........................... 2002-221837

(51) Int. Cl.$^7$ .............................................. F16D 27/00
(52) U.S. Cl. .................... 192/84.31; 192/110 R; 192/115
(58) Field of Search .................... 192/84.31, 90, 192/110 R, 110 B, 115, 125 A, 127

(56) References Cited

U.S. PATENT DOCUMENTS

| 2,962,144 | A | * | 11/1960 | Heinemann et al. | 192/84.31 |
|---|---|---|---|---|---|
| 3,263,784 | A | * | 8/1966 | Pierce | 192/84.31 |
| 3,877,804 | A | | 4/1975 | Hoppner | |
| 3,899,061 | A | * | 8/1975 | Krug | 192/84.31 |
| 4,664,238 | A | | 5/1987 | Nishino et al. | |
| 4,803,593 | A | | 2/1989 | Matsumoto et al. | |
| 5,148,902 | A | * | 9/1992 | Nakamura | 192/84.961 |
| 5,170,214 | A | * | 12/1992 | Negoro et al. | 399/326 |
| 5,594,539 | A | | 1/1997 | Murano et al. | |
| 5,799,229 | A | | 8/1998 | Yokoyama et al. | |
| 5,878,317 | A | | 3/1999 | Masuda et al. | |
| 5,913,095 | A | | 6/1999 | Takashima et al. | |
| 5,946,529 | A | | 8/1999 | Sato et al. | |

FOREIGN PATENT DOCUMENTS

| DE | 32 43 431 A1 | 5/1984 |
|---|---|---|
| EP | 1 288 518 A1 | 3/2003 |

* cited by examiner

Primary Examiner—Richard M. Lorence
(74) Attorney, Agent, or Firm—Oblon, Spivak, McClelland, Maier & Neustadt, P.C.

(57) ABSTRACT

A driving device, which can maintain a sufficient rated torque of the non-magnetization type electromagnetic clutch, comprises a driving motor and a driving gear. The driving motor and the driving gear are connected by a non-magnetization type electromagnetic clutch. The electromagnetic clutch comprises a driving shaft, wherein the driving shaft of the electromagnetic clutch is made of non-magnetic material. Because the driving shaft is made of non-magnetic material, therefore the magnetic field of the permanent magnet is not adversely affected or disordered, and a stable rated torque can be achieved.

10 Claims, 4 Drawing Sheets

DRIVING DEVICE AND FIXING DEVICE

CROSS-REFERENCE TO RELATED APPLICATION

This application claims the priority benefit of Japanese application serial no. 2001-263636, filed on Aug. 31, 2001, 2002-221837 filed on Jul. 30, 2002.

BACKGROUND OF THE INVENTION

1. Field of the Invention

This invention relates to a driving device for driving an image forming apparatus such as a copy machine, a printer or a facsimile etc.

2. Description of the Related Art

The driving device used in the driving unit of the image forming apparatus of electrophotography type such as a copy machine, a printer or a facsimile etc., is constructed by assembling a electromagnetic clutch in order to temporarily stop the driving parts or stop the driven parts alone during images formation. For example, the transporting roller, which is used on the transporting passage of the recording material form the sheet feeding device to the resist roller, can be connected to or released from the driving unit by the electromagnetic clutch. And the fixing roller of the fixing device also can be connected to or released from the driving unit by the electromagnetic clutch.

When the electromagnetic clutch is used in the driving device of the fixing device, with regard to continuous passage of the transferring papers, in a way that the drivings of the photoreceptor etc. and the fixing device can be independently controlled so that driving of the fixing device can be stopped for a time period after the previous transferring paper has passed through and until the next transferring paper is received by the fixing device. Then, immediately after the last transferring paper passes the fixing device, the fixing device can be stopped. In this way, the operation time of the fixing device is less than that of the entire image forming apparatus, and therefore the durability and the life of the fixing device can be effective extended.

The general electromagnetic clutch is of a magnetization type. In the magnetization type electromagnetic clutch, the magnetic field is created by the coil inside the clutch under the influence of the applied rated voltage, and the excitation type electromagnetic clutch is connected to the gears. However there are several drawbacks from using the magnetization type electromagnetic clutch in the driving device of the fixing device as described as follows. In the fixing device, usually a paper jam occurs when the transferring paper is clamped by the fixing roller and the pressure roller. In this condition, it is necessary to remove the jammed paper by manually turning the knob set on the driving shaft of the fixing roller. For removing the jammed paper, the front cover of the image forming apparatus is opened, and for the safety of the user, the interlock switch is turned off. In this situation, the rated voltage supply to the magnetization type is cut off and therefore the electromagnetic clutch and the driving will not be connected. Therefore, it is difficult to remove the jammed paper.

On the contrary, the non-magnetization type electromagnetic clutch will operate reversely compared to the magnetization type electromagnetic clutch when it is electrified. Therefore when the non-magnetization type electromagnetic clutch is connected to drive and when it is not electrified, then the jammed paper can be removed.

FIG. 4 is an example showing the non-magnetization type electromagnetic clutch. FIG. 4 is a cross-sectional view taken along an axial direction of the rotational shaft. The coil 27 and the outer yoke 28 are arranged on the fixing side of the non-magnetization type electromagnetic clutch. The driving shaft 29, the rotor 30 and the inner yoke 31 are arranged on the rotational side of the non-magnetization type electromagnetic clutch. The permanent magnet 32 is arranged on an end of the magnetism clearance portion between the outer yoke 28 at the fixing side and the inner yoke 31 at the rotational side.

When the coil 27 is not electrified, the magnetic circuit is formed by the permanent magnet 32 between the permanent magnet 32 and the armature 33. The electromagnetic attraction is generated between the outer yoke 28, the magnetic tip of the inner yoke 31 and the armature 33. The armature 33 will be drawn to the sides of the outer yoke 28 and the inner yoke 31 to transmit driving. On the contrary, when the coil 27 is electrified, a reverse magnetic circuit is formed between the permanent magnet 32 and the armature 33 to eliminate the magnetic attraction of the permanent magnet 32. In this way, the armature 33 is free from attraction and is released by the release spring to break driving.

However, there are drawbacks from using the non-magnetization type electromagnetic clutch in the drive device. For cost saving, the driving shaft 29 of the electromagnetic clutch, the bearing of the driving shaft 29 (not shown in FIG. 4) and the bracket supporting the electromagnetic clutch etc., are made of the magnetic material such as free cutting steel or zinc-treating steel plate etc. In this way, if the members beside the non-magnetization type electromagnetic clutch are tinged with magnetism, the permanent magnet 32 inside the electromagnetic clutch is adversely affected. So that the desired rated torque cannot be achieved.

SUMMARY OF THE INVENTION

For solving the problems described above, an object of this invention is to provide a driving device, which can maintain a sufficient rated torque of the non-magnetization type electromagnetic clutch. Furthermore, another object of the invention is to provide a fixing device, comprising the driving device, which can maintain a sufficient rated torque, and can perform a stable driving.

In accordance with the above objects and other objects, the present invention provides a driving device. The driving device, comprises a driving motor; and a driving gear. The driving motor and the driving gear is connected by a non-magnetization type electromagnetic clutch. A driving shaft of the electromagnetic clutch is constructed from a non-magnetic material.

According an aspect of the present invention, with regard to the bearings of the driving shaft of the driving device, at least one of the bearings closest to the electromagnetic clutch is made of non-magnetic material.

According to another aspect of the present invention, in the driving device, a supporter of the electromagnetic clutch is made of non-magnetic material.

According to another aspect of the present invention, in the driving device, the electromagnetic clutch is connected to the driving gear with a gear engageably connected to the electromagnetic clutch. The gear connecting the electromagnetic clutch is made of non-magnetic material.

According to another aspect of the present invention, with regard to members constructing the driving device, any one of the members constructed from a magnetic material is disposed at a location outside the influence of the magnetic field of the electromagnetic clutch.

According to another aspect of the present invention, the location not influenced by the magnetic field of the permanent magnet is the place with 80% or the less magnetic field decay. The place with 100% or the less magnetic field decay is favorable. It is same as follows.

According to another aspect of the present invention, in the driving device, a bearing of the driving shaft that is made of magnetic material is disposed at a location outside the influence of the magnetism of the electromagnetic clutch.

According to another aspect of the present invention, in the driving device, a supporter of the electromagnetic clutch that is made of magnetic material is disposed at a location outside the influence of the magnetic filed of the electromagnetic clutch.

According to another aspect of the present invention, in the driving device, a rear plate for installing the driving device is disposed at a location outside the influence of the magnetic field of the electromagnetic clutch.

Additionally, the present invention provides a fixing device, for fixing a toner image on a transferring paper, comprising the driving device described above.

Furthermore, the present invention provide a fixing device, for fixing a toner image on a transferring paper, comprising a driving device, wherein a driving motor and a driving gear is connected by a non-magnetization type electromagnetic clutch.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The embodiments of the present invention are explained in conjunction with the drawings as follows.

Figure 1:
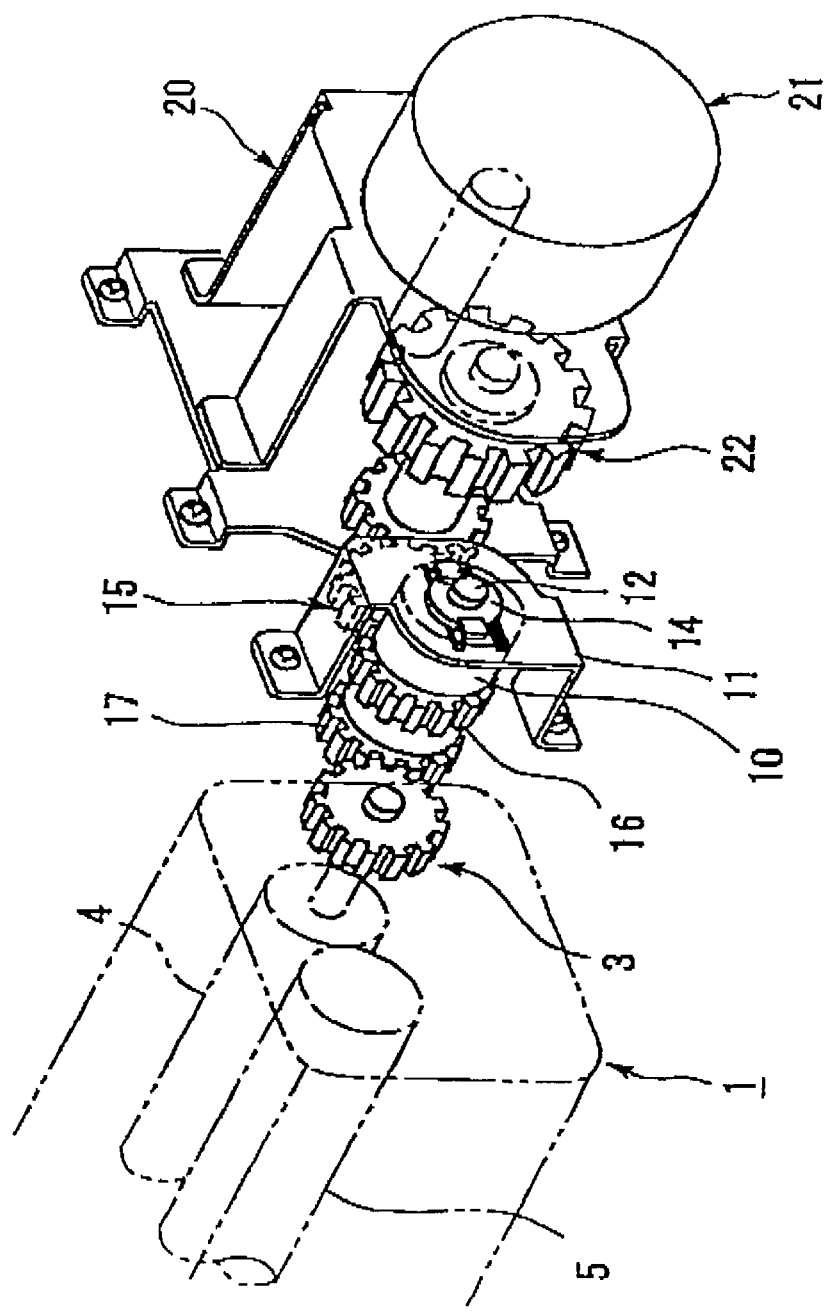
FIG. 1 is a perspective view shows the driving unit of the fixing device using the driving device of the present invention.
Figure 2:
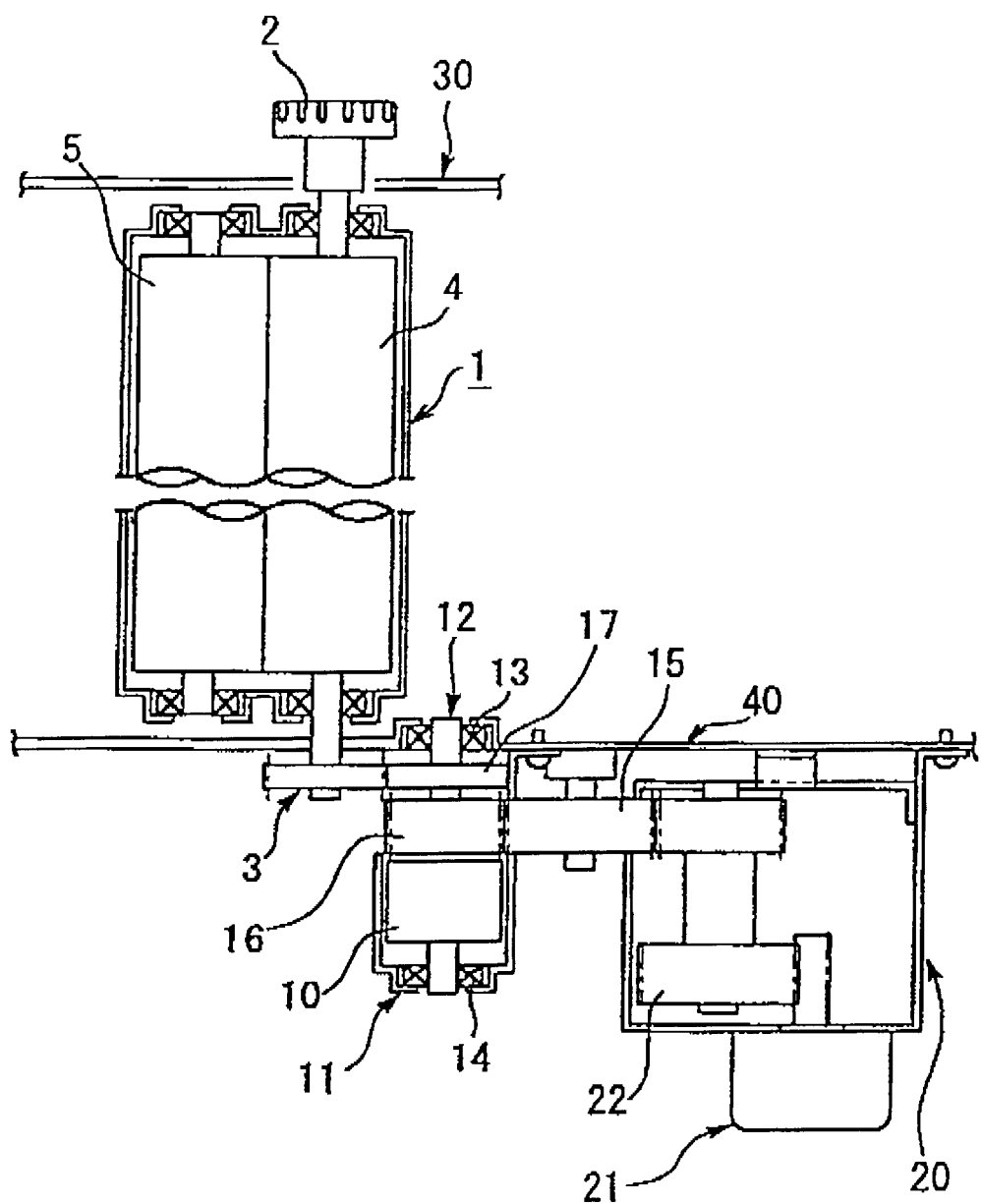
FIG. 2 is a top view of the fixing device of FIG. 1.

FIG. 1 is a perspective view showing an example of a driving unit of a fixing device using the driving device of the present invention. FIG. 2 is a top view of the fixing device shown in FIG. 1.

The fixing device 1 comprises a fixing roller 4 and a pressure driven roller 5. The driving unit of the fixing device 1 comprises a motor unit 20, an idle gear 15, a non-magnetization type electromagnetic clutch 10, a gear 16 connecting the electromagnetic clutch 10, a transmission drive gear 17 and a driving gear 3. Generally, the non-magnetization type electromagnetic clutch 10 is connected to the gear 16 under the condition that the voltage is not applied. Then, the driving force of the driving motor 21 is transmitted to the gear 16 through the idle gear 22 of the motor unit 20 and the idle gear 15. The driving force is then transmitted to the electromagnetic clutch 10 through the gear 16, and then transmitted to the transmission drive gear 17 to drive the driving gear 3.

When the voltage is applied to the electromagnetic clutch 10, a magnetic force equal to a permanent magnet's magnetic force created by a coil inside the clutch, is formed. Then these magnetic forces will cancel out each other to release the connection of the gear 16. Thus, the driving force of the driving motor 21 will be transmitted only up to the gear 16, and therefore transmission drive gear 17 and the driving gear 3 can be stopped.

In this way, the electromagnetic clutch 10 can release its connection with the driving gear 3 at the time when the motor unit 20 drives. Therefore, during the time when the transferring papers continuously pass through fixing device 1, the fixing device 1 can be independently controlled so that driving of the fixing device 1 can be stopped for a time period after the previous transferring paper has passed through and until the next transferring paper is received by the fixing device 1, and immediately after the last transferring paper passes through the fixing device 1, the fixing device 1 can be stopped. In this way, the operation time of the fixing device 1 can be less than that of the entire image forming apparatus, and therefore, the durability or the life time of the fixing device can be effectively prolonged.

Furthermore, when the jammed transferring paper clamped between the fixing roller 4 of the fixing device 1 and the pressure roller 5 is to be removed, the user opens for example, the front cover of the image forming apparatus to turn off the interlock switch. Because the driving gear 3 remain connected at this time, therefore the jammed transferring paper can be easily removed by manually turning the knob 2 which is set on the fixing roller 4.

The non-magnetization type electromagnetic clutch 10 used in the driving device of the present invention is constructed as follows. The electromagnetic clutch 10 is a structure supported by a bearing 13 and a bearing 14. The bearing 13 is penetrated by the driving shaft 12 and the driving shaft 12 is supported on the rear plate 40, and the bearing 14 is supported on the bracket 11 with the bracket 11 as a supporter. The driving shaft 12 is made of a non-magnetic material. The non-magnetic material, for example, can be a metal sheet or a mold of aluminum, copper, or austenite type stainless steel represented by the SUS303, etc. In the material, the austenite type stainless steel represented by the SUS303 is favorable in view of hardness.

In this way, because the driving shaft 12 is made of non-magnetic material, the magnetic field of the permanent magnet 32 inside the electromagnetic clutch 10 will not be disordered, and therefore a sufficient rated torque can be maintained.

With regard to the bearing 13 and the bearing 14 that support the driving shaft 12, it is preferred that at least the bearing 14 which is at a closest vicinity of the electromagnetic clutch 10 is made of non-magnetic material. If the bearing of the driving shaft 12 which is set close to the electromagnetic clutch 10 is made of a magnetic material, the magnetic field of the permanent magnet 32 existing in the electromagnetic clutch 10 will be disordered or adversely affected due influence of the magnetic material of the bearing of the driving shaft 12. With the structure as shown in FIG. 2, because the bearing 14 is close to the electromagnetic clutch 10 and thus would adversely affect the magnetic field, it is therefore preferred that at least the bearing 14 is made of a non-magnetic material. As mentioned above, copper type sinter is a preferred non-magnetic material.

Furthermore, the bracket 11 as the supporter of the electromagnetic clutch 10 is preferably made of non-magnetic material. In case if the bracket 11 is made of magnetic material, as the gap between the wall of the bracket 11 and the sidewall of the electromagnetic clutch 10 is small and the wall of the bracket 11 being close, therefore the magnetic field of the permanent magnet 32 existing in the electromagnetic clutch 10 may be disordered or adversely affected. Therefore, it is preferred that the bracket 11 is made of non-magnetic material so that the magnetic field of the permanent magnet will not be adversely affected or disordered, and a sufficient rated torque can be maintained. The non-magnetic material, for example, can be a metal sheet or mold of aluminum, copper, or austenite type stainless steel represented by the SUS303, etc. As mentioned above, the austenite type stainless steel represented by the SUS303 is favorable in view of hardness.

Additionally, it is preferred that the gear 16 connected to the electromagnetic clutch 10 is made of non-magnetic material. If the gear 16 is made of magnetic material, as the distance between the gear 16 and the permanent magnet inside the electromagnetic clutch 10 is short, therefore the magnetic field of the permanent magnet 32 may be adversely affected or disordered. Therefore, it is preferred that the gear 16 is made of non-magnetic material, therefore the magnetic field of the permanent magnet 32 will not be adversely affected or disordered, and thus a sufficient rated torque can be maintained. Though plastic material can be used as non-magnetic material, the polyacetal is favorable in view of hardness.

In order to achieve a sufficient rated torque without adversely affecting or disordering the magnetic field of the permanent magnet 32 existing in the electromagnetic clutch 10, the members of the driving device 1, which are made of magnetic material, should be disposed at a location outside the influence of the magnetic field of the permanent magnet 32. These members, for example, are, the bearings 13, 14 of the driving shaft 12 and the bracket 11 etc. In view of cost, the magnetic material such as free cutting steel can be used to construct the bearings 13, 14, and zinc-treated steel can be used to construct the bracket 11. In this situation, because these members are disposed at the place not covered by the magnetic field of the permanent magnet 32 of the electromagnetic clutch 10, the fixing roller 14 can be stably driven. Here, the place not covered by the magnetism of the permanent magnet is the place with 80% or the less magnetic field decay (100% or the less magnetic field decay is favorable).

For the same reason as above, the rear plate 40 for installing the driving device is preferably disposed at a location outside of the influence of the magnetic field of the permanent magnet 32 existing in the electromagnetic clutch 10. Because a sufficient strength is required for the rear plate 40 to support the driving device, therefore it is preferable that a magnetic material such as zinc-treated steel plate is generally used. Referring to FIG. 2, the layout of the image forming apparatus can be formed in a way that the rear plate 40 is disposed at a place apart from the electromagnetic clutch 10. With this arrangement, the magnetic field of the permanent magnet 32 existing in the electromagnetic clutch 10 will not be disordered, and a sufficient rated torque of the fixing roller 4 can be achieved.

Figure 3:
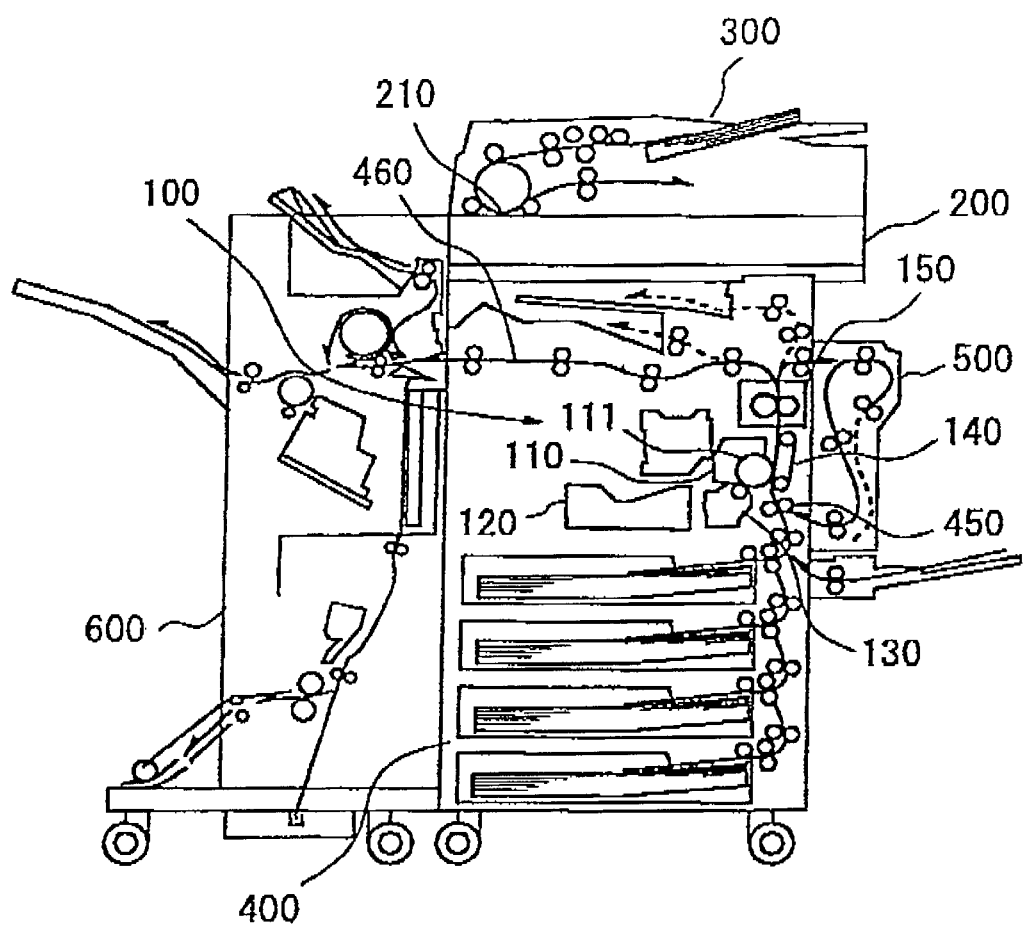
FIG. 3 shows the image forming apparatus carries with the fixing device of the present invention.
Figure 4:
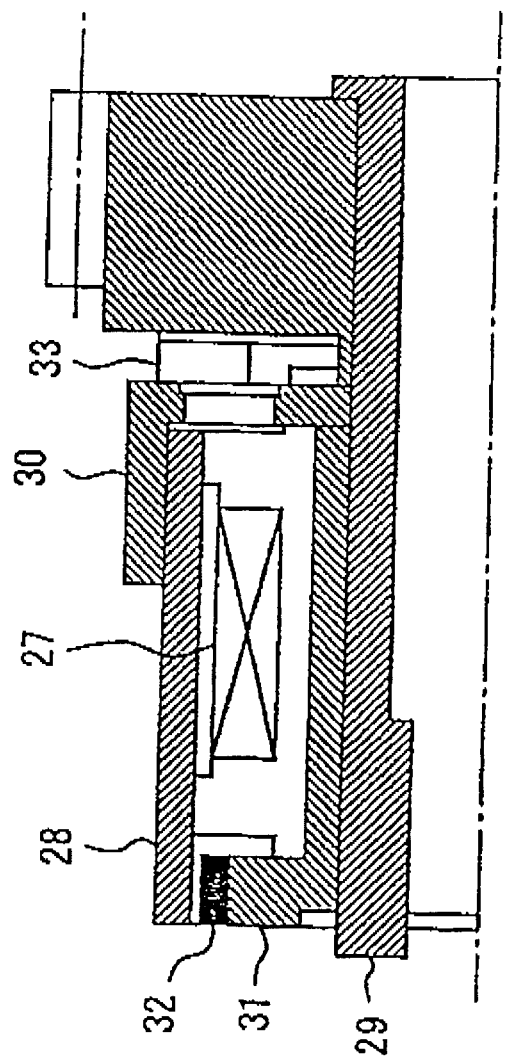
FIG. 4 shows an example of the structure of the non-magnetization type electromagnetic clutch.

FIG. 3 shows the structure of the image forming apparatus carrying the fixing device according to the present invention.

The image forming apparatus comprises an image forming unit 100, a scanner 200, an automatic document transporting device (ADF) 300, a sheet feeding unit 400, a two-face unit 500 and a finisher 600. The photosensing unit 110 comprises the photoreceptor 111 where an electrostatic latent image is formed thereon, a writing unit 120 for writing the electrostatic latent image, a developing unit 130 for developing the electrostatic latent image on the photoreceptor 111, a transferring unit 140 for transferring the toner image onto the transferring paper, a fixing unit 150 for melting and fixing the toner image transferred on the transferring paper.

The operation for forming the image is described as below. The document set on the ADF 300 is transported one by one to the reading unit 210 of the scanner 200 to read the image data.

In the image forming unit 100, the surface of the photoreceptor 111 is uniformly electrified by the electrifying member inside the photosensing unit 110. The electrostatic latent image is then written onto the surface of the photoreceptor 111 according to the image data previously read by the writing unit 120. The electrostatic latent image formed on the photoreceptor 111 is developed by the toner supplied from the developing unit 130 to form a toner image.

On the other hand, the transferring paper is fed from any one of the feeding trays of the sheet feeding unit 400. The transferring paper is transported to the resist unit 450 through the transporting passage, and then stopped. At the time when the toner image on the photoreceptor 111 arrives at the transferring unit 140, the transferring paper is then transported by the resist unit 450. During the transport of the transferring paper through the transferring belt of the transferring unit 140, the toner image on the photoreceptor 111 is transferred. After that, the transferring paper is transported by the fixing unit 150 and the toner image is melted and fixed.

After the toner image has been transferred onto the transferring paper, the residual toner on the surface of the photoreceptor 111 is cleaned by the cleaning device inside the photosensing unit 110 to prepare for the next operation for forming images.

Furthermore, when forming images on two surfaces of the transferring paper, the transferring paper passing through the fixing unit 150 is transported to the two-face unit 500. Then, the transferring paper is reversed to send to the resist unit 450. A series of operations for forming images as described above is performed on the surface of the photoreceptor 111. The formed toner image is transferred onto the back surface of the transferring paper by the transferring unit 140. The transferring paper is then transported to the fixing unit 150 and the toner image is melted and fixed to complete the process of forming the toner image onto the two faces of the transferring paper.

After completion of the toner image formation, the transferring paper is discharged to the finisher 600 through an intermediate unit 460.

When the fixing device of the present invention is carried on the fixing unit 150, the advantages are described as below. Because the driving device comprises the non-magnetization type electromagnetic clutch, during the continuous passage of the transfering papers or during formation of two-face images to next fixing step, the electromagnetic clutch is electrified. Thus, the operations of the fixing unit and the other unit can be independently controlled to stop the driving of the fixing unit 150. During the transferring paper where the toner image is completely formed is discharged to the finisher 600, the drivings of the fixing unit and the intermediate unit 460 are independently operational therefore the driving of the fixing unit 150 can be stopped. In this way, the durability and the life time of the fixing unit 150 can be effectively extended.

Furthermore, when paper is jammed in the fixing device 150, because the driving device comprises the non-magnetization type electromagnetic clutch, even though the power of the image forming apparatus is off, the fixing roller can be manually rotated, allowing easy removal of the jammed transferring paper.

With the embodiment as described so far, the driving device of the present invention, which comprises the non-magnetization type electromagnetic clutch, is explained by using the fixing device as an example. However, the present invention is not limited to the fixing device. For example, the transferring unit 140 etc. of the image forming apparatus as shown in FIG. 3 or the driving device of other unit can also be used. With the driving device of the present invention, the unit can be stably driven, and the durability and the life of the unit can be effectively extended.

In accordance with the above explanation, the present invention proposes a driving device, whose driving motor and driving gear are connected by the electromagnetic clutch. Because the driving shaft of the electromagnetic clutch is made of non-magnetic material, the magnetic field of the permanent magnet inside the electromagnetic clutch is not disordered, and a stable rated torque can be achieved.

Additionally, the present invention proposes a fixing device comprising the driving device having the non-magnetization type electromagnetic clutch. Therefore, a stable torque can be obtained, and the operation of removing jammed paper can be improved.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A driving device, comprising:
   a driving motor; and
   a driving gear, wherein the driving motor and the driving gear are connected by an electromagnetic clutch, said electromagnetic clutch being configured to disengage the driving motor and the driving gear when an electromagnet of the electromagnetic clutch is supplied with current, said electromagnetic clutch comprises a driving shaft, wherein said driving shaft is made of a non-magnetic material.

2. The driving device of claim 1, wherein the driving shaft further comprises a plurality of bearings and wherein at least one of the bearings closest to the electromagnetic clutch is made of a non-magnetic material.

3. The driving device of claim 1, wherein a supporter of the electromagnetic clutch is made of non-magnetic material.

4. The driving device of claim 1, wherein the electromagnetic clutch is connected to the driving gear through a gear, and wherein the gear is made of a non-magnetic material.

5. The driving device of claim 1, wherein in members constructing the driving device, any one of the members constructed from a magnetic material is disposed at a location outside an influence of a magnetic field of the electromagnetic clutch.

6. The driving device of claim 5, wherein a bearing of the driving shaft that is made of a magnetic material is disposed at a location outside the influence of the magnetic field of the electromagnetic clutch.

7. The driving device of claim 5, wherein a supporter of the electromagnetic clutch is made of magnetic material and said supporter is disposed at a location outside the influence of the magnetic field of the electromagnetic clutch.

8. The driving device of claim 1, wherein a rear plate for installing the driving device is disposed at a location outside an influence of a magnetic field of the electromagnetic clutch.

9. A fixing device, for fixing a toner image on a transferring paper, comprising the driving device of any one of claims 1 to 8.

10. A fixing device, for fixing a toner image on a transferring recording medium, comprising a driving device including a driving motor and a driving gear that are connected by an electromagnetic clutch, said electromagnetic clutch being configured to disengage the driving motor and the driving gear when an electromagnet of the electromagnetic clutch is supplied with current, said electromagnetic clutch comprises a driving shaft made of a non-magnetic material.

* * * * *